UNITED STATES PATENT OFFICE.

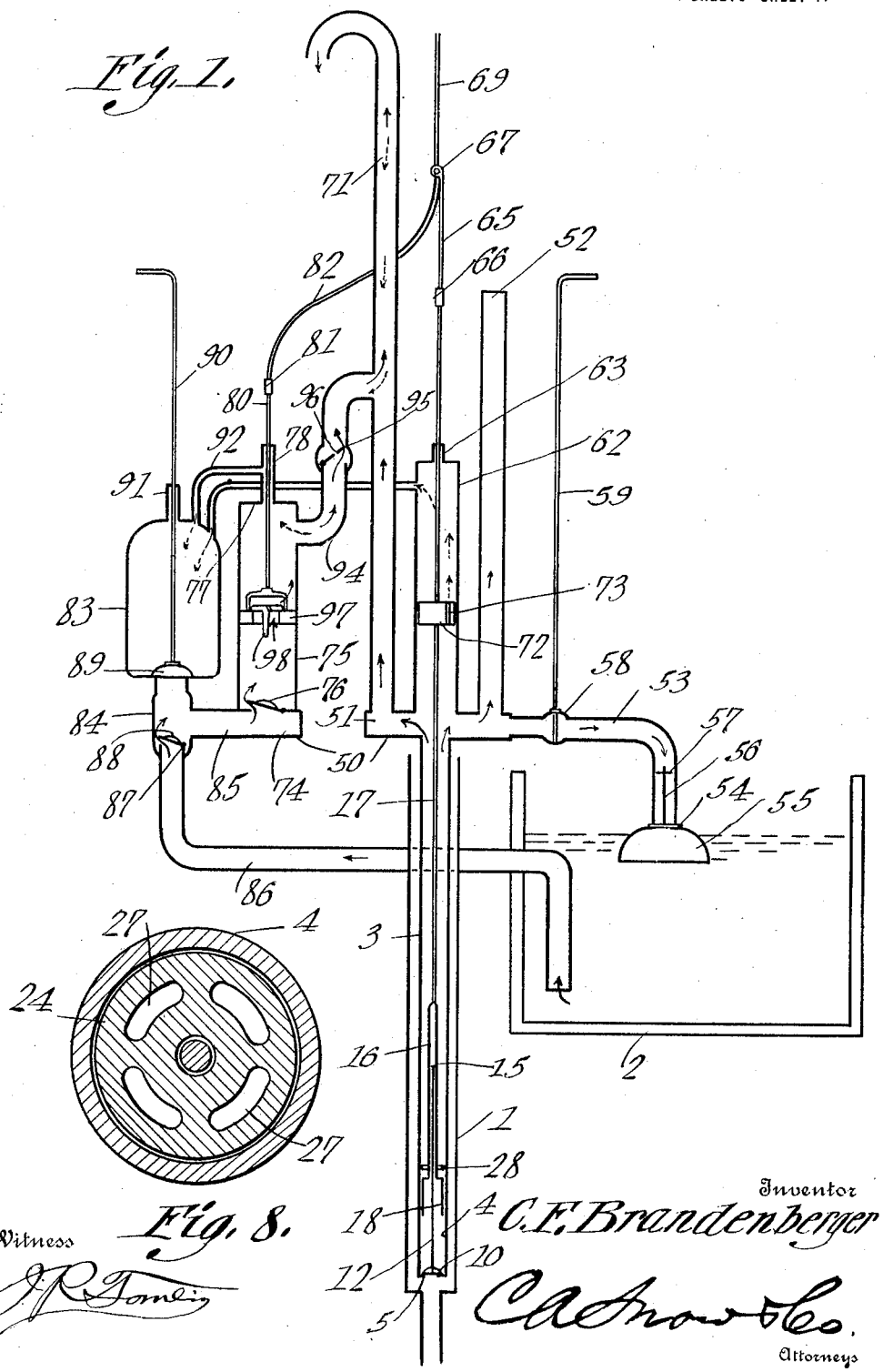

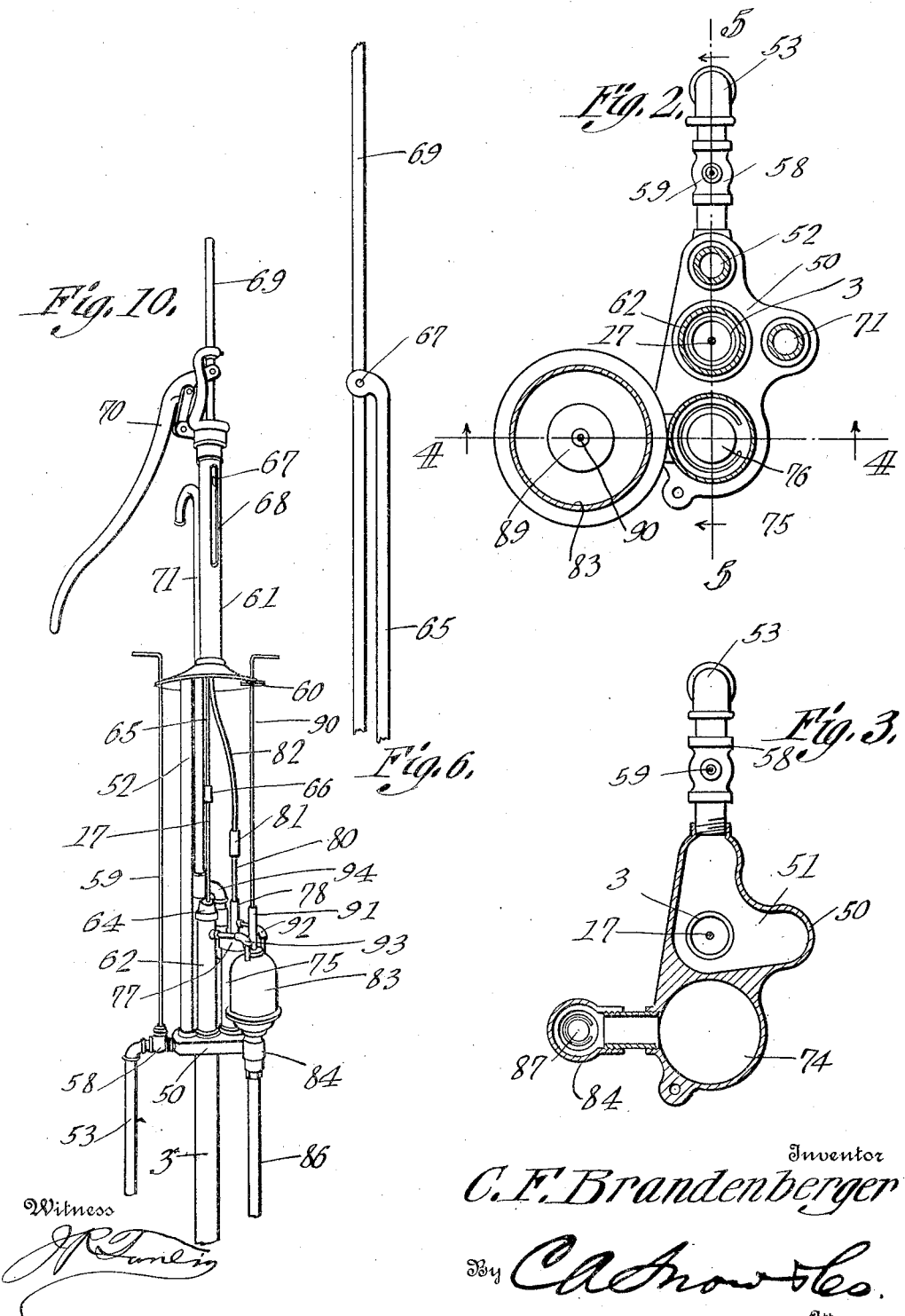

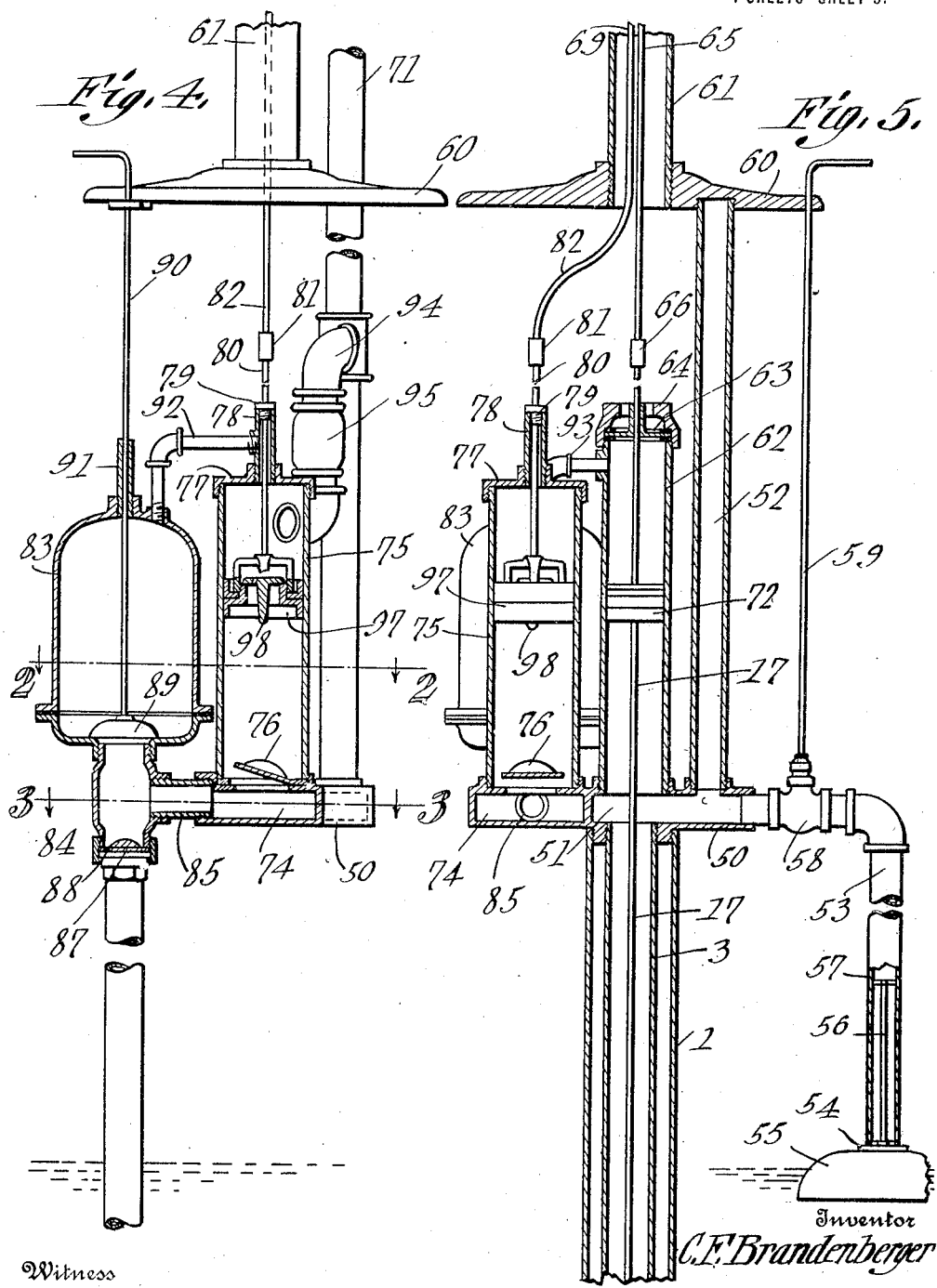

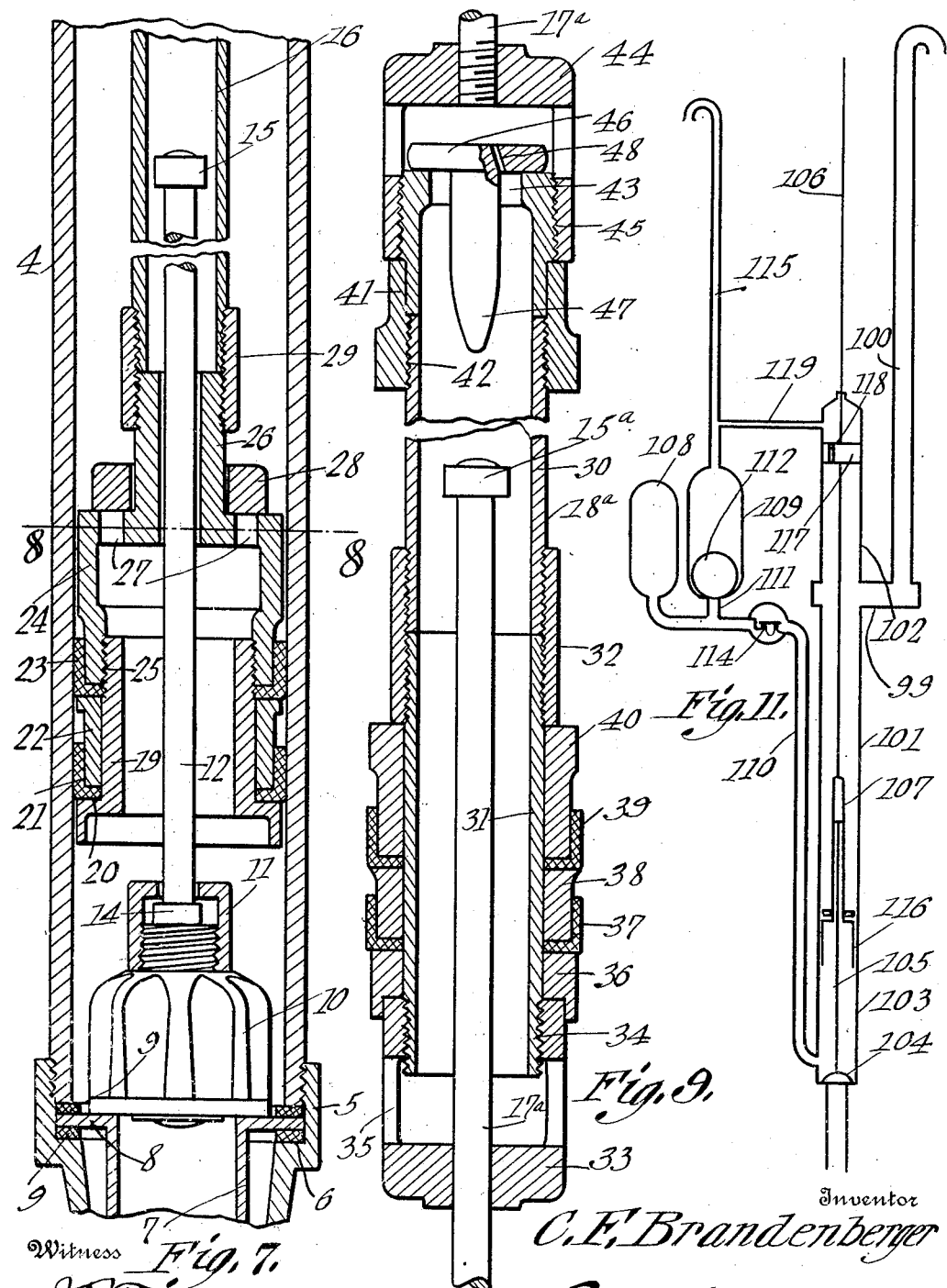

CARL F. BRANDENBERGER, OF FORT MADISON, IOWA.

DRAIN-STORAGE PUMP.

1,321,709.  Specification of Letters Patent.  Patented Nov. 11, 1919.

Application filed July 23, 1918. Serial No. 246,333.

*To all whom it may concern:*

Be it known that I, CARL F. BRANDENBERGER, a citizen of the United States, residing at Fort Madison, in the county of Lee and State of Iowa, have invented a new and useful Drain-Storage Pump, of which the following is a specification.

One object of the present invention is to provide novel means whereby the water in the standing parts of a pump may drain down below the frost line when the pump is not working.

Another object of the invention is to provide novel means whereby a reserve supply of water may be stored at a relatively high level, so as to be readily obtainable when the power available for pumping is small.

Another object of the invention is to provide means for saving water which may pass one of the pistons.

A further object of the invention is to improve the foot valve so that it may be lifted out along with the piston and the piston rod, without fishing for the valve.

The drawings show merely a few forms which the invention may take, and a mechanic may make changes in the forms which are shown, without departing from the spirit of the invention or jeopardizing the utility thereof.

In the drawings:—Figure 1 is a diagram wherein the main working parts of the pump are shown in a single plane, in order that a comprehensive idea of the entire structure may be obtained; Fig. 2 is a cross section on the line 2—2 of Figs. 4 and 10; Fig. 3 is a cross section on the line 3—3 of Fig. 4; Fig. 4 is a vertical section on the line 4—4 of Fig. 2; Fig. 5 is a vertical section on the line 5—5 of Fig. 2, parts remaining in elevation; Fig. 6 is a fragmental elevation showing the connection between certain of the pump rods; Fig. 7 is a vertical section showing the lower cylinder and parts therein; Fig. 8 is a cross section on the line 8—8 of Fig. 7; Fig. 9 is a vertical section showing a modification of the structure delineated in Fig. 7; Fig. 10 is a perspective view showing the upper portion of the mechanism hereinafter described; Fig. 11 is a diagram showing a modification.

The device shown in Figs. 1, 2, 3, 4, 5, 6, 7, 8, and 10, contemplates the use of a deep-well-casing 1 and a tank 2 of any desired size, the tank being located close to the surface of the ground, whereas the casing 1 extends downwardly to a water-bearing stratum. A pipe 3 is disposed in the casing 1 and carries a bottom cylinder 4 on which a foot 5 is threaded as shown in Fig. 7, the foot having a shoulder 6. A tubular seat 7 is provided and includes a flange 8 disposed between washers 9, the washers and the flange being bound between the shoulders 6 and the lower end of the cylinder 4. A foot valve 10 engages the flange 8 of the seat 7 and a cap 11 is threaded on the upper end of the foot valve. The numeral 12 denotes a rod or stem passing through the top of the cap 11 and supplied at its lower end with a knob 14 engaging the cap 11 so that when the rod is raised, the foot valve 10 will be raised also. There is an enlargement 15 at the upper end of the rod 12. The numeral 16 denotes the hollow lower end of a main piston rod 17 carrying a lower piston 18 operating in the cylinder 4. The lower piston 18 is a composite structure and includes a tubular body 19 having a shoulder 20 on which rests a packing ring 21 engaged by a collar 22 supporting a packing ring 23 compressed by a cylindrical top member 24 threaded at 25 on the body 19. The top member 24 has a neck 26, and there are openings 27 in the upper end of the member 24, about the neck 26. The openings 24 are controlled by a ring valve 28 mounted to slide on the neck 26 between the top of the member 24 and a coupling 29 threaded on the neck 26 and the end 16 of the main piston rod 17. The stem 12 of the foot valve 10 slides in the neck 26, and the enlargement 15 on the stem lies above the neck 26.

When it is desired to remove the foot valve 10, the lower piston 18 may be drawn upwardly by means of the rod 17, the enlargement 15 on the stem 12 of the foot valve engaging the upper end of the neck 26. Consequently, it is unnecessary to fish or prod for the foot valve, since that element is raised when the rod 17 and the piston 18 are raised. The foot valve 10 can open and close responsive to fluid pressure, because the stem 12 slides in the neck 26, and for a like reason, the piston 18 can reciprocate in the cylinder 4, without affecting the foot valve. Each of these elements therefore, can operate in the usual way, without affecting the other.

In Fig. 9, a modified form of the structure shown in Fig. 7 is delineated. The stem of the foot valve is shown at 17ᵃ, the enlargement at 15ª, and the numeral 18ª designates the lower piston generally. The piston 18ª comprises tubes 30 and 31 united by a threaded coupling 32. A foot piece 33 receives the stem 12ª slidably and is threaded at 34 upon the tube 31. The foot piece has side openings 35 and supports a ring 36 carrying a washer 37 retained by a ring 38 sustaining a washer 39 bound by a ring 40 held in place by the coupling 32. A cap 41 is threaded at 42 on the tube 30 and has an opening 43 in its upper end. A cage 44 is threaded at 45 on the cap 41. The opening 43 is controlled by a valve 46 having a stem 47 extended downwardly into the cap 41. To permit the downward drainage of water when the pump is idle, the valve 46 may have a by pass 48 which is so small that it does not affect the operation of the pump, saving to afford a drainage as above stated. A rod 17ª, corresponding to the rod 17, is assembled with the top of the cage 44.

When the piston 18ª is pulled upwardly by means of the rod 17ª, the foot valve will likewise be pulled up, when the enlargement 15ª on the valve stem 12ª engages the lower end of the foot piece 33.

The upper end of the pipe 3 is connected with a base 50 and communicates with a chamber 51 in the base. A pipe 52 is connected to the base 50 and opens into the chamber 51. A pipe 53 of angular form is connected to the base 50 and communicates with the chamber 51, the pipe 53 discharging into the tank 2. The lower end of the pipe 53 is controlled by a valve 54 carried by a float 55 responsive to changes of level in the tank 2, the valve having a stem 56 guided at 57 in the depending end of the pipe 53. A valve 58 may be interposed in the pipe 53 and is controlled by a rod 59 journaled in a foot plate 60 constituting part of a pump stock 61 of any desired construction. At this point it may be noted that the upper end of the pipe 52 is received in the foot plate 60, and it will now be understood that the pipe 52 is adapted to serve as an air chamber.

A cylinder 62 is mounted on the base 50 and communicates with the chamber 51. A guide 63 is held on the upper end of the cylinder 62 by a cap 64, the rod 17 sliding in the guide. For convenience in assembling, the main piston rod may include an upper section 65 connected to the part 17 by a coupling 66. The part 65 of the main piston rod is united by a detachable connection 67 with one part 69 of an auxiliary rod, which will be alluded to hereinafter. The connection 67 is accessible through a slot 68 in the pump stock 61. An actuating means 70, of any desired kind, is operatively connected with the auxiliary rod 69, to actuate that rod, and consequently the main piston rod 65—17.

A discharge spout 71 is connected to the base 50 and passes upwardly through the foot plate 60 of the pump stock 61, the spout communicating with the chamber 51 and, consequently, having its intake end disposed between the lower piston 18 and an upper piston 72 mounted on the rod 17 and operating in the cylinder 62. The upper piston 72 may be provided with a minute bypass 73, which, however, does not prevent the part 72 from operating as a solid piston.

There is a chamber 74 in the base 50, and the base carries a cylinder 75 communicating with the chamber. The cylinder 75 may be alluded to briefly as a third cylinder, since other cylinders 4 and 62 have been mentioned. There is a check valve 76 at the lower end of the cylinder 75, this check valve controlling the passage of liquid into the lower end of the cylinder from the chamber 74 in the base 50. A head 77 is carried by the upper end of the cylinder 75 and is supplied with a neck 78 carrying a gland 79 in which works a rod 80 united by a coupling 81 with the lower end of the auxiliary rod 69, the latter being off set as shown at 82 for connection with the rod 80. A piston 97 operates in the cylinder 75 and carries an upwardly opening valve 98.

The invention comprises a reservoir 83 connected by a T-coupling 84 and a nipple 85 with the chamber 74 in the base 50. A pipe 86 communicates with the lower end of the coupling 84 and discharges into the tank 2. A check valve 87 is located at the upper end of the pipe 86 where the same joins the coupling 84. The check valve 87 may be supplied with a minute bypass 88. A valve 89 is seated on the bottom of the reservoir 83 and controls the passage of liquid into the coupling 84, it being possible to lift the valve by means of a rod 90 slidable in the foot plate 60 of the pump stock, the reservoir having a neck 91 wherein the rod is guided.

A pipe 92 leads from the neck 78 of the cylinder 75 to the reservoir or dome 83, a pipe 93 leading from the cylinder 62 to the reservoir or dome. The pipe 93 opens into the cylinder 62, above the piston 72. That portion of the cylinder 75 which is above the piston 97 is connected with the discharge spout 71 by a conduit 94 in which is located an upwardly opening check valve 95 having a minute bypass 96.

Let it be supposed that the main piston rod 17—65 and the auxiliary piston rod 69—82—80 together are reciprocated by the operating mechanism 70, or in any other suitable way. On the upstroke, the foot valve 10 opens, and the valve 28 closes, and the lower piston 18 raises the water in the pipe 3. On the down stroke, the valve 28 opens, the foot valve 10 closes and supports the water column, and the upper piston 72 forces the water from the chamber 51 through the pipe 53 into the tank 2, the valve 58 being open. The water collects in the tank 2 and raises the float 55 until the valve 54 closes the lower end of the pipe 53 and cuts off the supply in the tank. The supply to the tank 2 may also be cut off permanently, by closing the valve 58 through the instrumentality of the rod 59. When the pistons 18 and 72 are reciprocated, the pipe 52 acts as an air chamber, and the water is forced out through the spout 71 to the place of delivery.

On the down stroke, a small quantity of water finds its way upwardly through the by pass 73 in the upper piston 72, or leaks around the piston. The water which thus accumulates above the piston 72 as a result of down strokes, is delivered by an upstroke through the pipe 93 and passes into the reservoir 83, the valve 89 being closed. On the down stroke, the valve 98 opens, the valve 76 closes, and water in the cylinder 75 passes above the piston 97. On the up stroke, some of the water above the piston 97 passes through the pipe 92 into the reservoir 83, and the water delivered through the pipes 92 and 93 accumulates in the reservoir until the pressure of air in the reservoir above the water therein equals the pressure produced by the pistons 97 and 72. The valve 89 has two functions. First, it may be opened to permit the water in the reservoir 83 to prime the cylinder 75; and second, by closing the reservoir 83 at its bottom, it prevents an upward circulation through the reservoir and prevents the water in the reservoir from being sucked back through the pipes 92 and 93 when the piston 97 moves downwardly. When the piston 97 moves upwardly, the water in the cylinder 75 above the piston 97 passes through the conduit 94 past the check valve 95 and is discharged into the spout 71. On the up stroke of the piston 97, the valves 76 and 87 open, and water is drawn from the tank 2. As the level of the water in the tank 2 is lowered, the float 55 moves downwardly, the valve 54 is unseated, and the level is restored by water delivered through the pipe 53, assuming that the valve 58 is open.

As a consequence of all the foregoing, it will be noted that water is pumped out of the casing 1, which represents a deep well, and at the same time, a liberal supply of water is kept practically at a continuous level in the tank 2, which may be located close to the surface of the ground, and be of any size. Let it be supposed that the device is operated by a wind-mill, and that the wind flats out to a gentle breeze which does not have power enough to work the pistons 72 and 18, and draw water from the deep well casing 1. Then, the main piston rod 17—65 may be disconnected at 67 from the auxiliary piston rod 69—82—80, and the latter alone will operate, the reserve supply of water in the tank 2 being drawn therefrom by the piston 97 and passing through the pipe 86, the valves 87 and 76 opening to permit the passage of the water. The water above the piston 97 is delivered through the conduit 94 past the valve 95, into the discharge spout 71.

When the pump is idle, the water in the spout 71 will drain downwardly through the conduit 94 by way of the bypass 96 in the valve 95 into the cylinder 75 above the piston 97 and pass from thence by way of the pipe 92 to the reservoir 83, which is located far enough below the level of the soil, so that the water therein will not freeze. The water in the spout 71, further, may pass downwardly through the spout, upwardly in the cylinder 62, through the bypass 73 in the piston 72 and into the reservoir 83 by way of the pipe 93. The water in the coupling 84 and the sleeve 85 can drain downwardly into the pipe 86 through the bypass 88 in the valve 87.

In the modification of Fig. 11, pipe 101 is connected to a base 99 having a spout or discharge 100. The upper cylinder is shown at 102 and the lower cylinder at 103. The numeral 104 marks a foot valve like the part 10, carried by a stem 105 corresponding to the part 12. The piston rod 106 corresponds to the member 17 and has a hollow lower end 107 as disclosed in Fig. 7. The piston rod 106 carries an upper piston 117 having a bypass 118, the lower piston appearing at 116. A pipe 110 leads from the lower cylinder 103 and contains a check valve 114. The pipe 110 is connected at 111 to a storage dome 109 within which operates a valve 112. The dome 109 has an overflow 115 connected at 119 with the upper cylinder 102 above the upper piston 117. The extremity of the pipe 110 communicates with a common air chamber 108. The operation of the device shown in Fig. 11 need not be gone into, in view of what has been stated in connection with the operation of the structure shown in Fig. 1. The two structures have common features which, applied to Fig. 11, embody a pipe 101, an upper cylinder 102 and a lower cylinder 103 assembled therewith, pistons 117 and 116, a discharge 100 leading from the pipe at a point between the pistons, a drain storage dome 109, an outlet 110 for the dome, a check valve 114 in the outlet, a valve 112 controlling the passage of liquid from the dome to the outlet, and means 119 for conveying liquid to the dome from a point in the upper cylinder 102 above the upper piston 117.

I claim:—

1. In a device of the class described, a pipe; upper and lower cylinders assembled therewith; upper and lower pistons working in the respective cylinders; a discharge leading from the pipe at a point between the pistons; a drain storage dome; an outlet for the dome; a check valve in the outlet; a valve controlling the passage of liquid from the dome to the outlet; and means for conveying liquid to the dome from a point in the upper cylinder above the upper piston.

2. In a device of the class described, a supply-pipe; upper and lower cylinders assembled therewith; upper and lower pistons operating in the respective cylinders, the pipe having an outlet disposed between the pistons; a tank; means for discharging liquid into the tank from the pipe at a point between the pistons; a valve controlling said means; a third cylinder; a third piston operating in the third cylinder; means for releasably connecting the third piston on the one hand with the upper and lower pistons on the other hand; a dome; a connection between the dome and that portion of the third cylinder which is above the third piston; a connection between the dome and that portion of the upper cylinder which is above the upper piston; a pipe discharging into the tank and communicating with the lower end of the dome, and with the third cylinder below the third piston; a valve controlling the passage of liquid from the dome to the tank pipe; and an outlet for the third cylinder.

3. A device of the class described, constructed as set forth in claim 2, and further characterized by the fact that the outlet for the third cylinder discharges into the pipe outlet.

4. A device of the class described, constructed as set forth in claim 2, and further characterized by the fact that the valve which controls the means for discharging liquid into the tank from the supply pipe is a float-operated valve responsive to changes of level in the tank.

5. A device of the class described, constructed as set forth in claim 2, and further characterized by the fact that the valve which controls the means for discharging liquid into the tank from the supply pipe is a valve which is under the control of an operator.

In testimony that I claim the foregoing as my own, I have hereto affixed my signature in the presence of two witnesses.

CARL F. BRANDENBERGER.

Witnesses:
H. J. SCHROEDER,
FLORENCE H. BRAYTON.

Copies of this patent may be obtained for five cents each, by addressing the "Commissioner of Patents, Washington, D. C."